United States Patent
Yamamoto et al.

(10) Patent No.: US 9,461,460 B2
(45) Date of Patent: Oct. 4, 2016

(54) CIRCUIT CONTROL DEVICE, CIRCUIT SYSTEM, SWITCH STATE DETECTION CIRCUIT AND VEHICLE

(71) Applicant: Rohm Co., Ltd., Kyoto (JP)

(72) Inventors: Tomoki Yamamoto, Kyoto (JP); Hideki Matsubara, Kyoto (JP); Satoru Kominami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 158 days.

(21) Appl. No.: 14/228,438

(22) Filed: Mar. 28, 2014

(65) Prior Publication Data

US 2014/0293487 A1    Oct. 2, 2014

(30) Foreign Application Priority Data

Mar. 29, 2013  (JP) ................................. 2013-072269

(51) Int. Cl.
*H02H 5/04* (2006.01)
(52) U.S. Cl.
CPC ..................... *H02H 5/04* (2013.01)
(58) Field of Classification Search
CPC .................. H02H 5/04–5/048; H02H 7/0852
USPC ................................. 700/299; 361/93.9, 103
See application file for complete search history.

(56) References Cited

U.S. PATENT DOCUMENTS

2006/0106503 A1* 5/2006 Lamb ..................... H02J 3/14
700/299

FOREIGN PATENT DOCUMENTS

JP          4575333          7/2010

* cited by examiner

*Primary Examiner* — Stephen W Jackson
*Assistant Examiner* — Christopher Clark
(74) *Attorney, Agent, or Firm* — Fish & Richardson P.C.

(57) ABSTRACT

A circuit control device for controlling power consumption of a plurality of circuit units includes a monitoring unit configured to monitor whether a detection temperature of each of the circuit units meets a predetermined overheat condition, and an overheat protection unit configured to execute an overheat protection operation when the overheat condition is met in any one of the circuit units, wherein the overheat protection operation is an operation to reduce power consumption of an overheat unit meeting the overheat condition, among the circuit units, and a neighbor unit disposed near the overheat unit.

16 Claims, 11 Drawing Sheets

CIRCUIT CONTROL DEVICE, CIRCUIT SYSTEM, SWITCH STATE DETECTION CIRCUIT AND VEHICLE

CROSS-REFERENCE TO RELATED APPLICATION

This application is based upon and claims the benefit of priority from Japanese Patent Application No. 2013-072269, filed on Mar. 29, 2013, the entire contents of which are incorporated herein by reference.

TECHNICAL FIELD

The present disclosure relates to a circuit control device for controlling a circuit unit, a circuit system, a switch state detection circuit and a vehicle having the same.

BACKGROUND

Conventionally, various devices in which a plurality of circuit units are disposed side by side have been used. Generally, such devices have an overheat protection function in order to prevent a breakdown, or the like thereof due to overheated circuit units.

According to a general overheat protection function, for example, when a certain circuit unit is overheated, power consumption thereof is reduced. Thus, heating of the overheated circuit unit is restrained, and when heating of the circuit unit is a main cause of overheating, the circuit unit is expected to recover from the overheated state.

Temperatures of the respective circuit units as described above may be affected by heat generated from a neighboring circuit unit, as well as heat generated by themselves. When a certain circuit unit overheats, another major anticipated reason for overheating is from an influence of heat diffused from a neighboring circuit unit.

In this case, only reducing power consumption of the overheated circuit unit may take time for the circuit unit to recover from the overheated state or may make it difficult for the circuit unit to recover from the overheated state. Also, in order to seek recovery from the overheated state by only reducing power consumption of the overheated circuit unit, power consumption of the circuit unit needs to be relatively greatly reduced. For this reason, the function of the circuit unit may be greatly limited.

SUMMARY

The present disclosure provides some embodiments of a circuit control device capable of controlling overheating of a circuit unit, a circuit system, a switch state detection circuit and a vehicle having the same.

According to one embodiment of the present disclosure, there is provided a circuit control device for controlling power consumption of a plurality of circuit units including: a monitoring unit configured to monitor whether a detection temperature of each of the circuit units meets a predetermined overheat condition; and an overheat protection unit configured to execute an overheat protection operation when the overheat condition is met in any one of the circuit units, wherein the overheat protection operation is an operation to reduce power consumption of an overheat unit meeting the overheat condition, among the circuit units, and a neighbor unit disposed near the overheat unit. With this configuration, overheating of a circuit unit can be more appropriately controlled.

In some embodiments, the monitoring unit may be configured to monitor whether a detection temperature of the overheat unit meets a predetermined overheat recovery condition, and when the overheat recovery condition is met, the overheat protection unit may be configured to stop the overheat protection operation.

In some embodiments, the overheat condition may be a condition met when a temperature is equal to or higher than a predetermined first threshold value, and the overheat recovery condition may be a condition met when a temperature is equal to or lower than a predetermined second threshold value.

In some embodiments, the overheat protection operation may be an operation to reduce power consumption of the overheat unit, and reduce power consumption of the neighbor unit when the overheat recovery condition is not met within a predetermined period of time after reducing the power consumption of the overheat unit.

In some embodiments, the monitoring unit may have a temperature sensor that corresponds to each of the circuit units.

In some embodiments, the neighbor unit may include circuit units disposed on both sides of the overheat unit.

According to another embodiment of the present disclosure, there is provided a circuit system, including: the circuit control device of the foregoing configuration; and a plurality of circuit units whose power consumption is controlled by the circuit control device. With this configuration, advantages of the circuit control device of the foregoing configuration can be obtained. In some embodiments, the plurality of circuit units may have the same circuit configuration.

In some embodiments, each of the circuit units may have a current source circuit configured to supply a current, and the overheat protection operation may be an operation to reduce an amount of the current in the overheat unit and the neighbor unit.

According to still another embodiment of the present disclosure, there is provided a switch state detection circuit, including: the circuit system of the foregoing configuration; and a detection unit configured to detect a state of each of a plurality of switches connected to the circuit system, wherein each of the circuit units is configured to supply a current to a corresponding switch of the plurality of switches, and the detection unit is configured to detect the state of each of the plurality of switches operation based on the current supplied to each of the plurality of switches. With this configuration, advantages of the circuit control device of the foregoing configuration can be obtained.

According to still another embodiment of the present disclosure, there is provided a vehicle, including: the switch state detection circuit of the foregoing configuration; and a switch whose state is detected by the switch state detection circuit. With this configuration, advantages of the circuit control device of the foregoing configuration can be obtained.

DETAILED DESCRIPTION

Hereinafter, some embodiments of the present disclosure will be described.

First Embodiment

Figure 1:
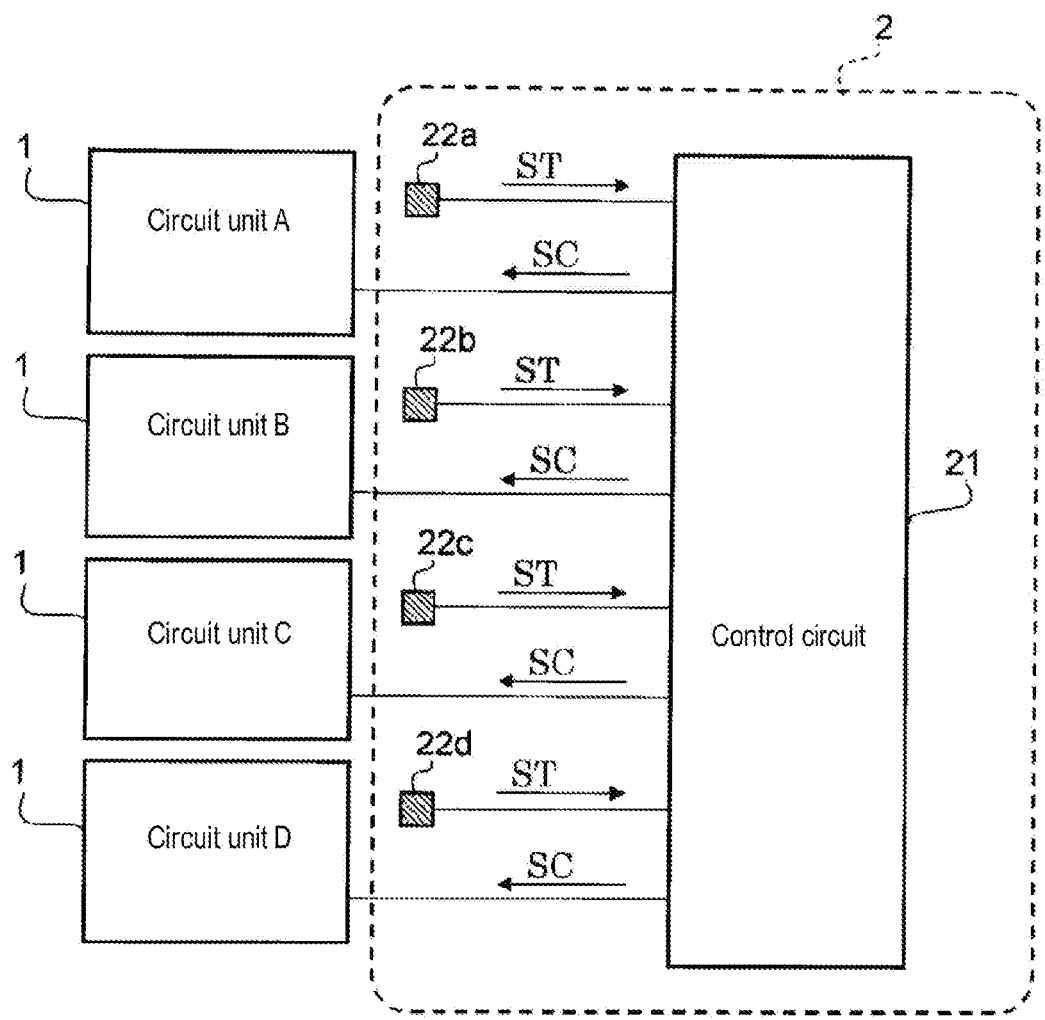
FIG. 1 is a view illustrating a configuration of a circuit system according to an embodiment.

First, a first embodiment of the present disclosure will be described. FIG. 1 is a view illustrating a configuration of a circuit system 9 according to the first embodiment. As illustrated in FIG. 1, the circuit system 9 includes a plurality of circuit units 1 (here, four circuits A to D, for example), and a circuit control device 2.

The circuit unit 1 is a circuit configured to execute a predetermined function by consuming power (e.g., a circuit serving as a current source). The respective circuit units 1 are disposed side by side in proximity to each other (in the example of FIG. 1, the respective circuit units 1 are disposed in a vertical direction). Further, the number, an arrangement direction, or the like of the circuit units 1 is not limited to the foregoing configuration or form.

The circuit control device 2 is a device for controlling power consumption of each circuit unit 1, and has a control circuit 21 and temperature sensors 22a to 22d (hereinafter, collectively referred to as a "temperature sensor 22") installed to correspond to each of the circuit units 1. Further, the temperature sensor 22a corresponds to the circuit unit A, the temperature sensor 22b corresponds to the circuit unit B, the temperature sensor 22c corresponds to the circuit unit C, and the temperature sensor 22d corresponds to the circuit unit D.

Each of the temperature sensors 22 is disposed near the corresponding circuit unit 1 in order to precisely detect a temperature of the corresponding circuit unit 1. Also, each temperature sensor 22 transmits a detection signal ST indicating a detection temperature of the corresponding circuit unit 1 to the control circuit 21.

The control circuit 21 generates a control signal SC for controlling power consumption of each of the circuit units 1 based on the received detection signal ST, and transmits the generated control signal SC to each circuit unit 1. Further, the circuit system 9 may be used as a part of a switch state detection circuit to be described below, for example, but a usage type, or the like of the circuit system 9 is not particularly limited.

Figure 2:
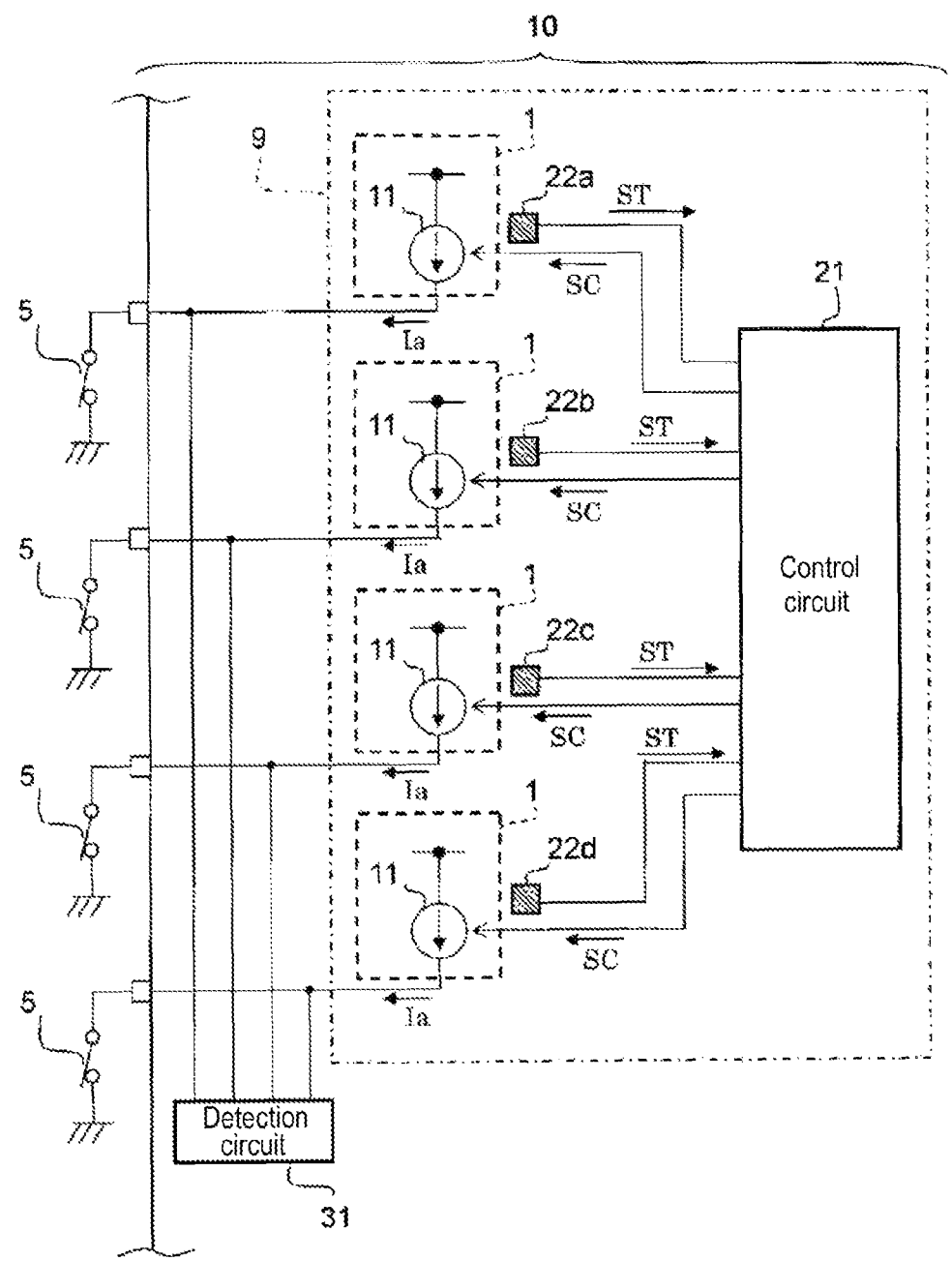
FIG. 2 is a view illustrating a configuration of a switch state detection circuit and a periphery thereof according to the present embodiment.

FIG. 2 is a view illustrating a configuration of a switch state detection circuit 10 having the circuit system 9 installed therein and a periphery thereof. The switch state detection circuit 10 is used as a circuit for detecting an opening and closing state of a plurality of opening and closing switches 5 (here, four opening and closing switches 5, for example). The switch state detection circuit 10 includes the foregoing circuit system 9 and a detection circuit 31. The respective opening and closing switches 5 are connected to the switch state detection circuit 10 such that they correspond to any one circuit unit 1.

The circuit units 1 each includes a current source circuit 11 for supplying a current Ia toward the corresponding opening and closing switch 5. The circuit units 1 may have the same circuit configuration. Each current source circuit 11 is configured to vary an amount of supplied current Ia (e.g., vary an amount of supplied current Ia by three stages), and the amount of current Ia is set based on the control signal SC received by the control circuit 21.

Further, the current Ia supplied by each circuit unit 1 is used to detect an opening and closing state of the corresponding opening and closing switch 5. That is, when the opening and closing switch 5 is closed, the current Ia flows to the opening and closing switch 5, and when the opening and closing switch 5 is open, the current Ia does not flow to the opening and closing switch 5. Upon detecting the current Ia, the detection circuit 31 determines an opening and closing state of each opening and closing switch 5. Also, the detection circuit 31 may be installed separately for each of the opening and closing switches 5, for example.

Figure 3:
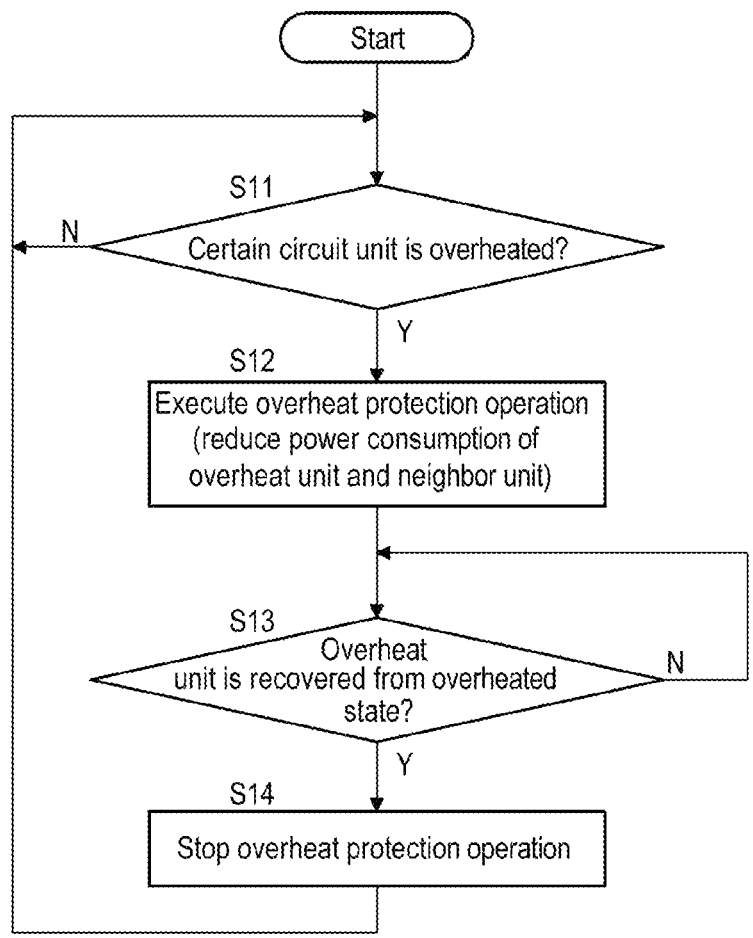
FIG. 3 is a flow chart illustrating an overheat protecting operation according to a first embodiment.

When a certain circuit unit 1 overheats, the control circuit 21 executes an overheat protection operation to control the overheated state. Hereinafter, an operation flow of the overheat protection operation will be described with reference to the flow chart of FIG. 3.

The control circuit 21 monitors whether a certain circuit unit 1 is overheated based on the detection signal ST received from each temperature sensor 22 (step S11). The control circuit 21 monitors the situation by comparing a detection temperature indicated by each detection signal ST with a predetermined threshold value α1.

When a detection temperature indicated by a certain detection signal ST is equal to or greater than the threshold value α1, the control circuit 21 determines that the circuit unit 1 corresponding to the detection signal ST is overheating. That is, when a detection temperature of a certain circuit unit 1 meets an overheat condition (a condition met when a detection temperature of a certain circuit unit 1 is equal to or higher than the threshold value α1), the control circuit 21 determines that the circuit unit 1 is overheating.

When the certain circuit unit 1 is determined to be overheated (Y in step S11), the control circuit 21 executes an overheat protection operation (step S12).

This overheat protection operation is an operation to reduce power consumption of the overheated circuit unit 1 (hereinafter, may also be referred to as an "overheat unit") and a neighboring circuit unit 1 (hereinafter, may also be referred to as a "neighbor unit") disposed near the overheated circuit unit 1. The control circuit 21 reduces power consumption by transmitting a control signal SC to the overheated circuit unit 1 and the neighboring circuit unit 1 such that an amount of current of the current source circuit 11 in the overheated circuit unit 1 and the neighboring circuit unit 1 becomes smaller than that at a normal operation time.

Figure 4:
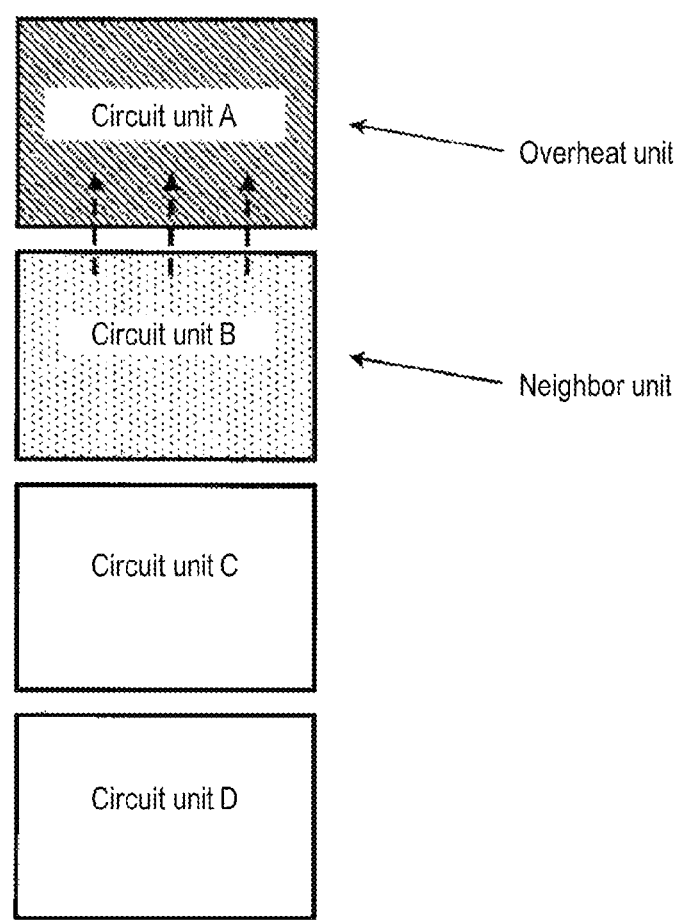
FIG. 4 is a view illustrating determination of a neighbor unit.

For example, when a circuit unit A is an overheat unit, a circuit unit B disposed in the vicinity of the circuit unit A is a neighbor unit, as illustrated in FIG. 4. Since the circuit unit B is near the circuit unit A, heat generated by the circuit unit B may be readily transmitted to the circuit unit A as indicated by the broken line arrows in FIG. 4.

Thus, a temperature of the circuit unit A is greatly affected by the heating of the circuit unit B. Accordingly, when power consumption of the circuit unit B together with that of the circuit unit A is reduced, the overheated state of the circuit unit A may be more effectively recovered, in comparison to a case in which only power consumption of the circuit unit A is reduced.

Figure 5:
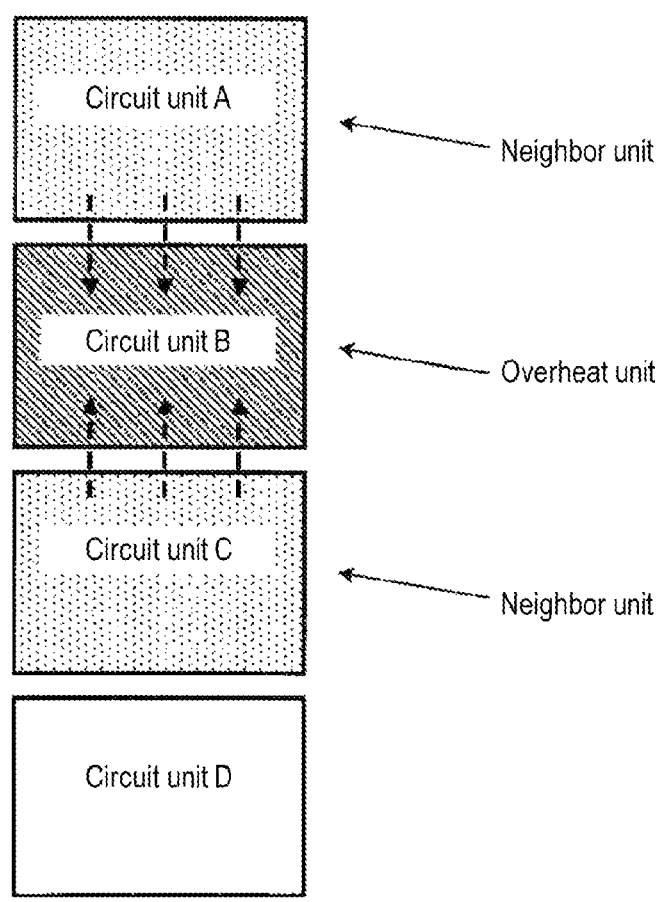
FIG. 5 is a view illustrating determination of a neighbor unit.

Further, for example, when the circuit unit B is an overheat unit, the respective circuit units A and C disposed on both sides of the circuit unit B are neighbor units, as illustrated in FIG. 5. Since the respective circuit units A and C are near the circuit unit B, heat generated by the respective circuit units A and C are readily transmitted to the circuit unit B as indicated by the broken line arrows in FIG. 5.

Thus, a temperature of the circuit unit B is greatly affected by the heating of the respective circuit units A and C. Accordingly, when power consumption of the respective circuit units A and C is reduced together with that of the circuit unit B, the overheated state of the circuit unit B may be more effectively recovered, in comparison to a case in which only power consumption of the circuit unit B is reduced.

Referring back to FIG. 3, the control circuit 21, in a state of executing the overheat protection operation, monitors whether the overheat unit is recovered from the overheated state based on the detection signal ST received from the temperature sensor 22 corresponding to the overheat unit (step S13).

The control circuit 21 performs monitoring by comparing the detection temperature indicated by the corresponding detect signal ST with a predetermined threshold value $\alpha 2$ (a value lower than the threshold value $\alpha 1$). When the detection temperature indicated by the corresponding detection signal ST is equal to or lower than the threshold value $\alpha 2$, the control circuit 21 determines that the overheat unit has recovered from the overheated state. That is, when the detection temperature of the overheat unit meets an overheat recovery condition (a condition met when the detection temperature of the overheat unit is equal to or lower than the threshold value $\alpha 2$), the control circuit 21 determines that the overheat unit has recovered from the overheated state.

When it is determined that the overheat unit has recovered from the overheated state (Y in step S13), the control circuit 21 stops the overheat protection operation (step S14). Thereafter, the operation of the control circuit 21 is returned to the operation of step S11.

Figure 6:
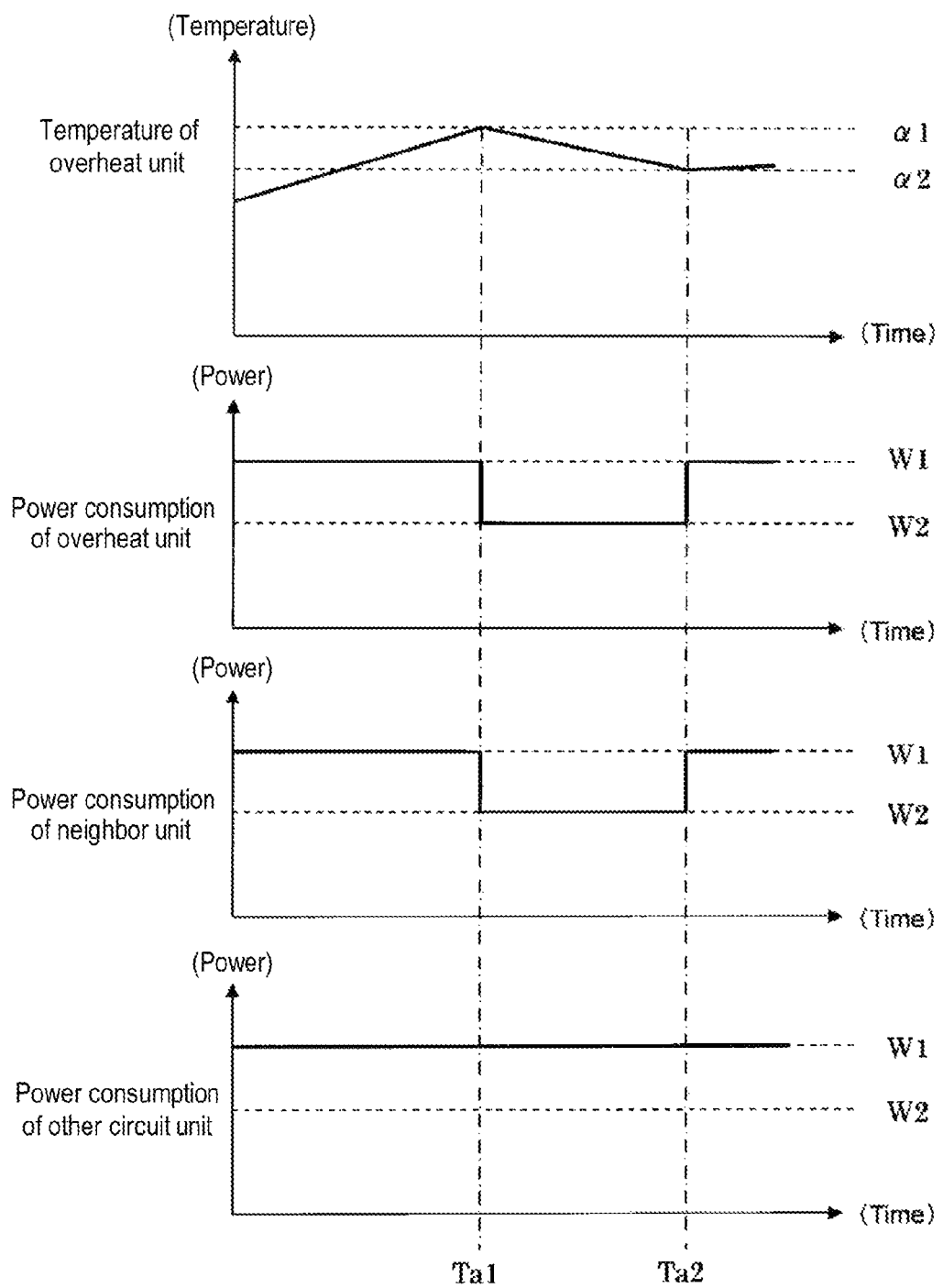
FIG. 6 is graphs showing a temperature, and the like of an overheat unit according to the first embodiment.

FIG. 6 shows graphs of a temperature of an overheat unit, power consumption of the overheat unit, power consumption of a neighbor unit, and power consumption of any other circuit unit, when the operations of steps S11 to S14 is performed.

In a normal operation state, that is, when a temperature of any circuit unit 1 does not reach the threshold value $\alpha 1$, power consumption of the circuit unit 1 has a normal power value W1. And, when a temperature of a certain circuit unit 1 reaches the threshold value $\alpha 1$ (Ta1 in FIG. 6), power consumption of the overheat unit and the neighbor unit has a power value W2 lower than the power value W1. In addition, power consumption of any other circuit unit 1 is maintained at the power value W1.

Since power consumption of the overheat unit and the neighbor unit is reduced, the amount of heat generated by the overheat unit and the neighbor unit is reduced, and the temperature of the overheat unit is lowered due to heat dissipation, or the like. Thus, the state of the overheat unit goes toward recovery from the overheated state.

Further, when the temperature of the overheat unit reaches the threshold value $\alpha 2$ (Ta2 in FIG. 6), power consumption of the overheat unit and the neighbor unit is returned to the power value W1. Thus, the overheat unit and the neighbor unit may exert a normal function as the circuit units 1 operating in a normal operation state.

Regarding Neighbor Unit

As described above, heating of the neighbor unit (the circuit unit 1 disposed near the overheat unit) greatly affects a temperature of the overheat unit. Thus, the control circuit 21 reduces power consumption of the neighbor unit as an overheat protection operation in order to effectively recover the overheat unit from the overheated state.

Regarding a method for determining a neighbor unit, various aspects may be employed according to a disposition form of the circuit units 1, or the like within a range of the above-described purpose. For example, when the circuit units 1 are present on both sides of the overheat unit, both of the circuit units 1 on both sides may be determined to be neighbor units (see FIG. 5), or any one of them may be determined to be a neighbor unit.

Figure 7:
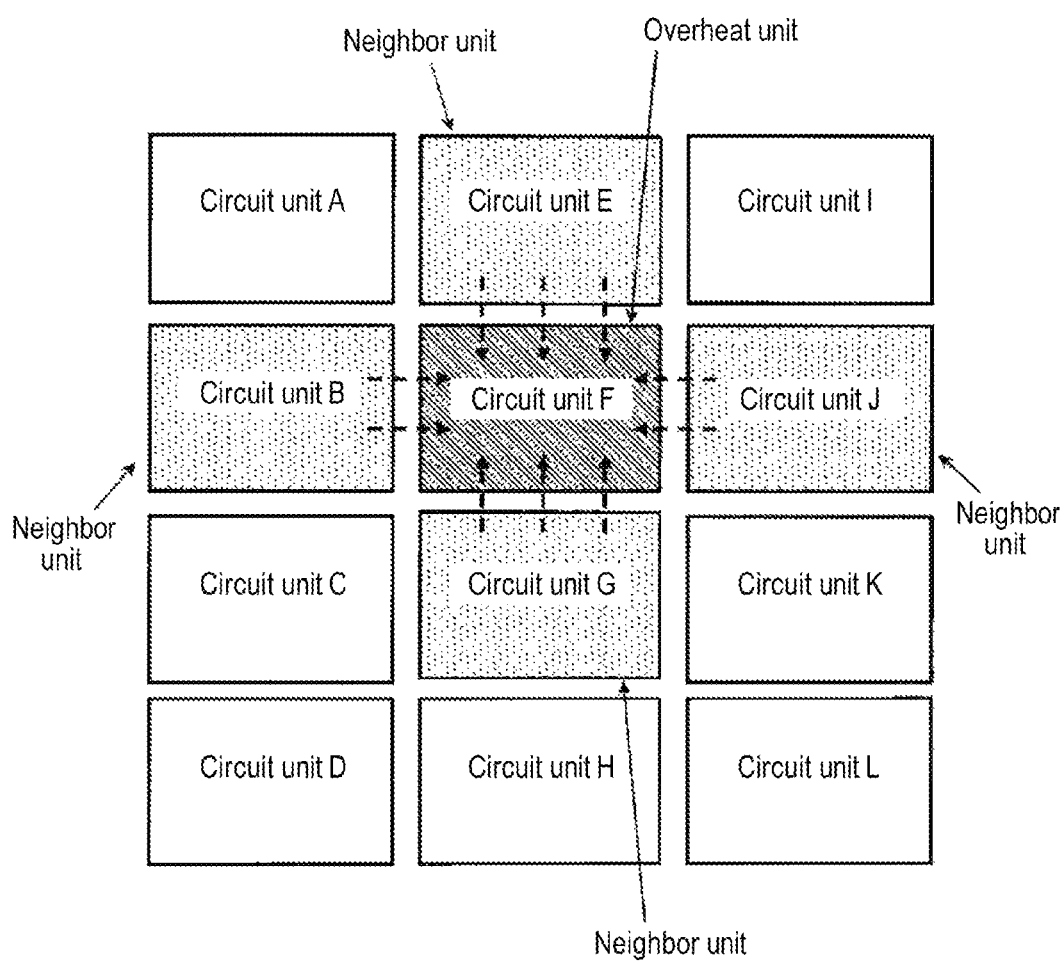
FIG. 7 is a view illustrating determination of a neighbor unit.
Figure 8:
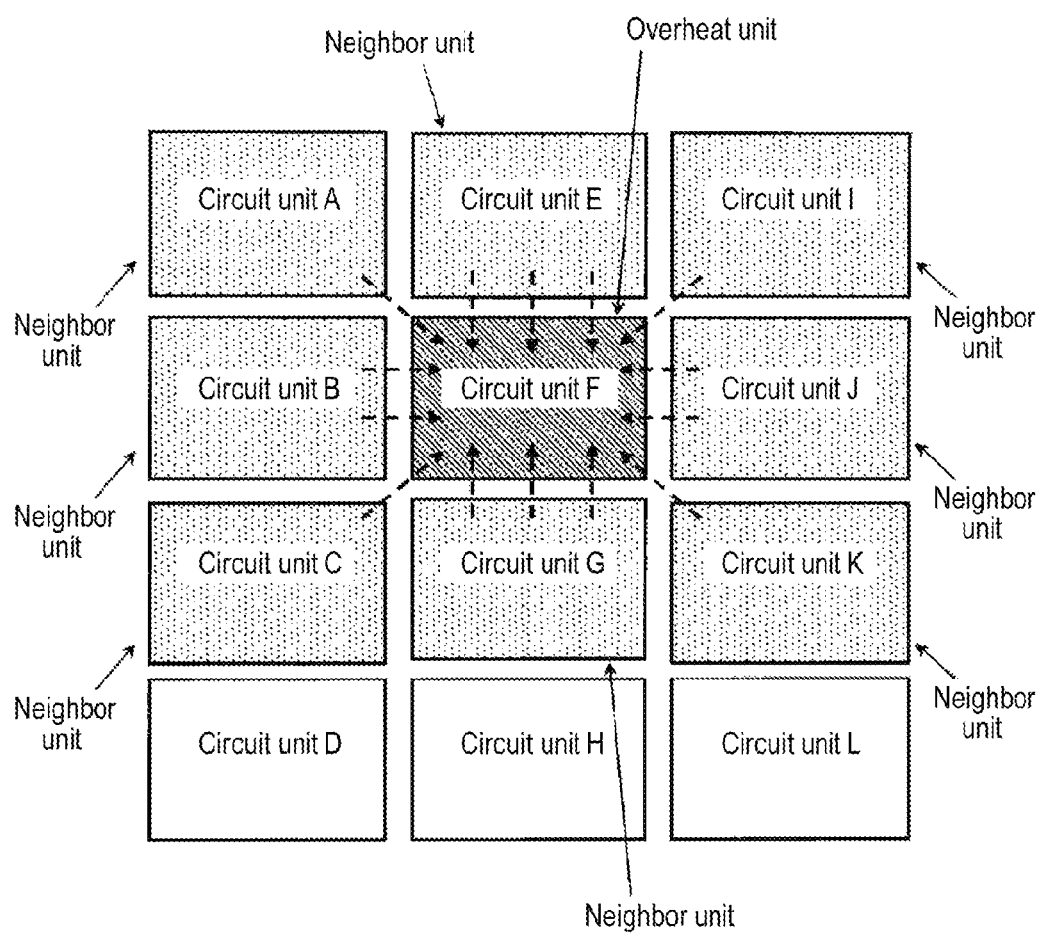
FIG. 8 is a view illustrating determination of a neighbor unit.

In addition, for example, when the circuit units 1 are disposed two-dimensionally, a vertical direction and a horizontal direction may be considered, and further, an oblique direction may also be considered. FIGS. 7 and 8 show examples in which a plurality of circuit units 1 (circuit units A to L) are disposed two-dimensionally.

Further, FIG. 7 shows an example in which a vertical direction and a horizontal direction are considered (but an oblique direction is not considered) in a method for determining neighbor units. According to this example, for instance, when the circuit unit F is overheated, the circuit units E and G disposed on both sides thereof in the vertical direction and the circuit units B and J disposed on both side thereof in the horizontal direction are determined to be neighbor units. In this case, the overheat unit (i.e., the circuit unit F) may be effectively recovered from an overheated state by reducing heat transmission indicated by the broken line arrows in FIG. 7.

Further, FIG. 8 shows an example in which a vertical direction, a horizontal direction, and oblique directions are considered in a method for determining neighbor units. According to this example, for instance, when the circuit unit F is overheated, in addition to the circuit units E, G, B, and J, the circuit units A, C, I, and K disposed on both sides in the oblique directions are determined to be neighbor units. In this case, the overheat unit (i.e., the circuit unit F) may be effectively recovered from an overheated state by reducing heat transmission indicated by broken line arrows in FIG. 8.

In addition, in an overheat protection operation, power consumption may be equally reduced in any neighbor unit, or weighting may be provided to a degree of reduction when power consumption of the neighbor unit is reduced.

For example, in the case in which neighbor units are determined as illustrated in FIG. 8, heat radiated from the neighbor units (circuit units A, C, I, and K) neighboring the overheat unit (the circuit unit F) in the oblique directions does not greatly affect the temperature of the overheat unit, in comparison to the neighbor units (circuit units B, E, G, and J) neighboring the overheat unit in the vertical and horizontal directions. Thus, in reducing power consumption of the neighbor units neighboring the overheat unit in the oblique directions, a smaller degree of power may be reduced, in comparison to the neighbor units neighboring the overheat unit in the vertical and horizontal directions.

Second Embodiment

Next, a second embodiment of the present disclosure will be described. The second embodiment is basically the same as the first embodiment, except for the overheat protection operation. In the following description, the overheat protection operation of the second embodiment will be mainly described, and descriptions of the configuration common to the first embodiment and the second embodiment will be omitted.

Figure 9:
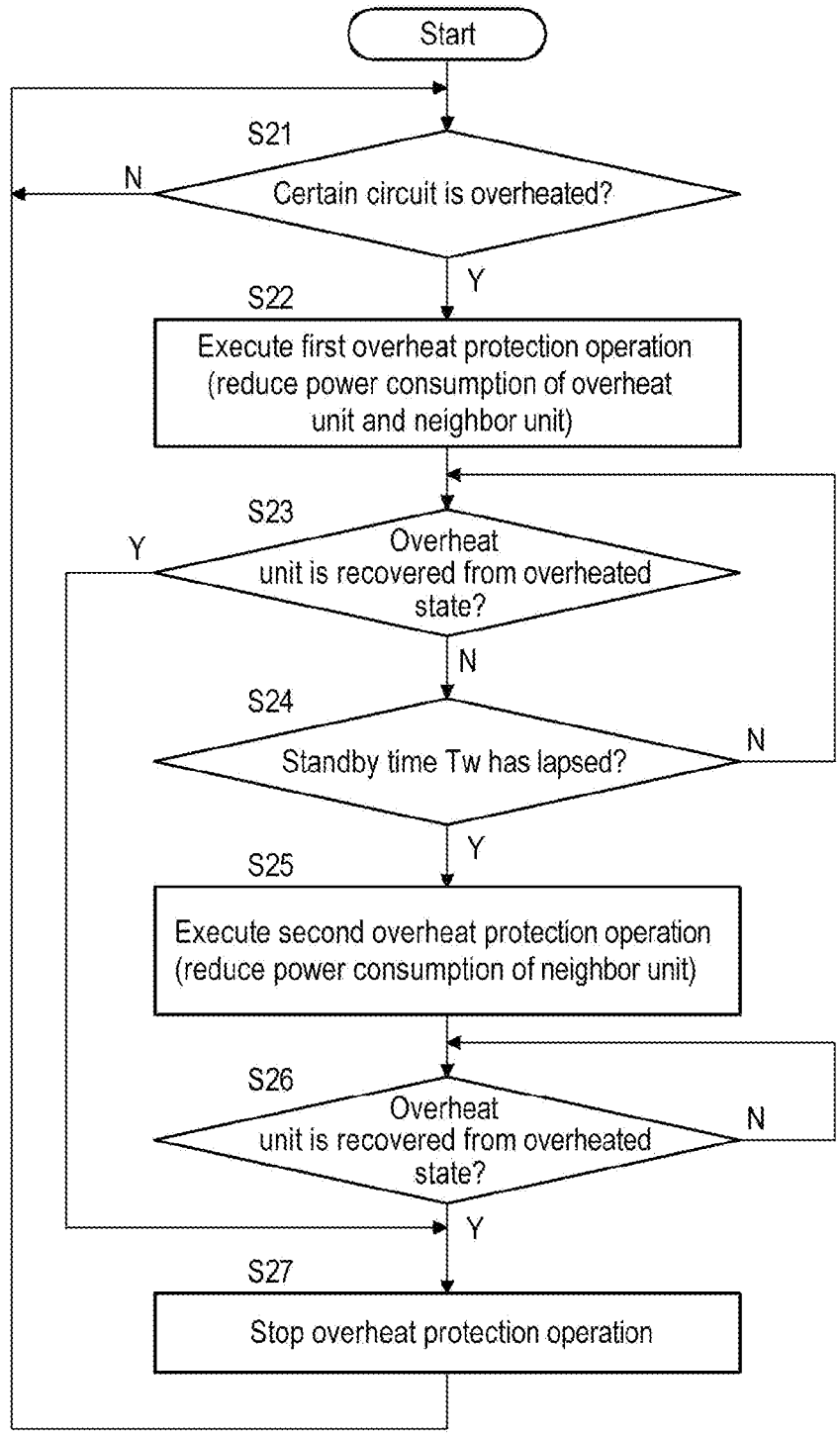
FIG. 9 is a flow chart illustrating an overheat protecting operation according to a second embodiment.

An operation flow of the overheat protection operation in the second embodiment will be described below with reference to the flow chart of FIG. 9.

The control circuit 21 monitors whether a certain circuit unit 1 is overheated based on a detection signal ST received from each temperature sensor 22 (step S21). The operation content in step S21 is basically the same as that in step S11 of the first embodiment. And then, when a certain circuit unit 1 is determined to be overheated (Y in step S21), the control circuit 21 executes a first overheat protection operation (step S22).

The first overheat protection operation is an operation to reduce power consumption of the overheat unit. The control circuit 21 transmits a control signal SC such that an amount of current of the current source circuit 11 becomes smaller than that at a normal operation time, thus reducing power consumption of the overheat unit. Further, power consumption of neighbor units is not reduced in this step.

When executing the first overheat protection operation, the control circuit 21 monitors whether the overheat unit has recovered from the overheated state (step S23) or whether a predetermined standby time Tw (e.g., a few of 10 ms), starting from a point in time at which the first overheat protection operation was initiated to be executed, has lapsed (step S24). Also, the operation content in step S23 is basically the same as that in step S13 of the first embodiment.

When it is determined that the overheat unit has recovered from the overheated state (Y in step S23), the control circuit 21 stops the overheat protection operation (here, the first overheat protection operation) (step S27). Thereafter, the operation of the control circuit 21 is returned to the operation in step S21.

Meanwhile, in the case in which the standby time Tw, starting from the point in time at which the first overheat protection operation was initiated to be executed, has lapsed (Y in step S24), that is, in the case in which the overheated state of the overheat unit has not been recovered within the standby time Tw, the control circuit 21 executes a second overheat protection operation (step S25).

The second overheat protection operation is an operation to reduce power consumption of a neighbor unit. The control circuit 21 transmits the control signal SC to the neighbor unit, as well as to the overheat unit, such that an amount of current of the current source circuit 11 becomes smaller than that at the normal operation time, thus reducing power consumption. Accordingly, power consumption of the overheat unit and the neighbor unit may be reduced.

When executing the first and second overheat protection operations, the control circuit 21 monitors whether the overheat unit has recovered from the overheated state (step S26). Also, the operation content in step S26 is basically the same as that in step S13 of the first embodiment.

When it is determined that the overheat unit has recovered from the overheated state (Y in step S26), the control circuit 21 stops the overheat protection operations (here, the first and second overheat protection operations) (step S27). Thereafter, the operation of the control circuit 21 is returned to the operation of step S21.

Figure 10:
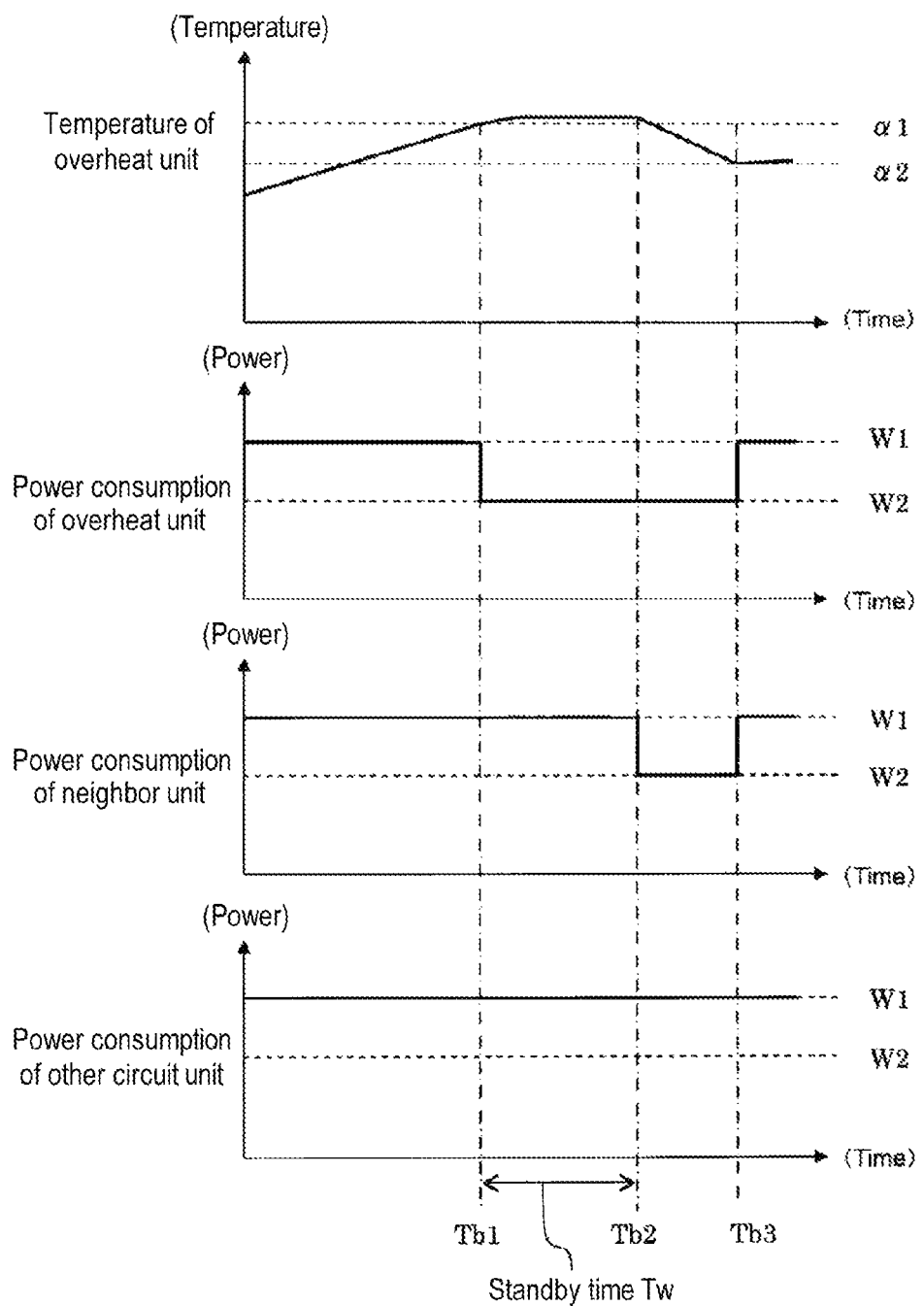
FIG. 10 is graphs showing a temperature, and the like of an overheat unit according to the second embodiment.

FIG. 10 illustrates graphs of a temperature of an overheat unit, power consumption of the overheat unit, power consumption of a neighbor unit, and power consumption of any other circuit unit when performing the operations in steps S21 to S27 as described above.

In a normal operation state, that is, when a temperature of any circuit unit 1 does not reach the threshold value α1, power consumption of the certain circuit unit 1 also has a normal power value W1. And, when a temperature of the certain circuit unit 1 reaches the threshold value α1 (Tb1 in FIG. 10), power consumption of the overheat unit has a power value W2 lower than the power value W1. Further, power consumption of the neighbor unit and any other circuit unit is maintained at the power value W1.

Thus, since a heat generating amount of the overheat unit is reduced, the overheated state of the overheat unit is likely to go toward recovery at this stage. In particular, in a case in which a major cause of the overheated state is heating by the overheat unit itself, the overheat unit may quickly recover from the overheated state, without reducing power consumption of a neighbor unit.

However, if a major cause of the overheated state is heat transmitted from a neighbor unit, it may be difficult to quickly recover the overheat unit from the overheated state by merely reducing power consumption of the overheat unit. As illustrated in FIG. 10, even when the standby time Tw has lapsed (Tb2 in FIG. 10), if a temperature of the overheat unit has not reached the threshold value α2, power consumption of the neighbor unit is reduced to have the power value W2 from this time on.

By reducing power consumption of the overheat unit and the neighbor unit, their respective heat generating amount may be reduced and the overheated state of the overheat unit can be quickly recovered. When a temperature of the overheat unit reaches the threshold value α2 (Tb3 in FIG. 10), power consumption of the overheat unit and the neighbor unit is returned to the power value W1. Accordingly, the overheat unit and the neighbor unit may exert a normal function as the circuit units 1 operating in a normal operation state.

As described above, the control circuit 21 according to the second embodiment executes the first overheat protection operation (operation to reduce power consumption of the overheat unit), and when the overheat recovery condition is not met within the standby time Tw after executing the first overheat protection operation, the control circuit 21 executes the second overheat protection operation (operation to reduce power consumption of the neighbor unit).

Thus, in a case in which the overheated state can be quickly recovered (within the standby time Tw) by merely executing the first overheat protection operation, the overheat protection operation is finished without reducing power consumption of the neighbor unit. That is, through the circuit control device 2 of the second embodiment, the overheated state may be recovered by using an appropriate method according to whether or not the overheated state can be quickly recovered by executing only the first overheat protection operation.

Effects

As described above, the circuit control device 2 according to the above-described embodiments of the present disclosure controls power consumption of the plurality of circuit units 1. Further, the circuit control device 2 monitors whether a detection temperature meets a predetermined overheat condition with respect to each of the circuit units 1 and executes an overheat protection operation when the overheat condition is met in any one of the circuit units 1.

The overheat protection operation is an operation to reduce power consumption of the overheat unit and the neighbor unit. Thus, the circuit control device 2 can more appropriately restrain overheating of the circuit units 1.

That is, if one of the major causes of overheating of the overheat unit is heat radiated from a neighbor unit, it may take time to recover the overheat unit from the overheated state or it may be difficult for the overheat unit to recover from the overheated state by merely reducing power consumption of the overheat unit. However, in the above-described embodiments, since the circuit control device 2 also reduces power consumption of the neighbor unit, the foregoing problem may be restrained.

Further, in order to seek recovery of the overheat unit from the overheated state by simply reducing power consumption, power consumption of the overheat unit may need to be relatively greatly reduced. However, in the above-described embodiments, since the circuit control device 2 also reduces power consumption of the neighbor unit, although a reduction amount of power consumption of the overheat unit is relatively small, the same overheat restraining effect can be obtained. Therefore, the problem in which a function of the overheat unit is greatly limited can be restrained.

In addition, the switch state detection circuit 10 according to above-described embodiments of the present disclosure includes the foregoing circuit system 9, and the detection circuit 31 for detecting an opening and closing state of each of the plurality of connected opening and closing switches 5. And, each of the circuit units 1 supplies the current Ia toward each of the opening and closing switches 5, and the detection circuit 31 detects the opening and closing state of each of the plurality of opening and closing switches 5 based on the current Ia.

Also, the switch state detection circuit 10 is used as a type of vehicle-mount device, for example. In this case, the switch state detection circuit 10 is installed in a vehicle to detect an opening and closing state of each opening and closing switch 5 installed in the vehicle. The switch state detection circuit 10 then provides corresponding detection results to a vehicle-mount control device (a microcomputer, or the like). Accordingly, the vehicle-mount control device may perform control based on the opening and closing state of each opening and closing switch 5.

Figure 11:
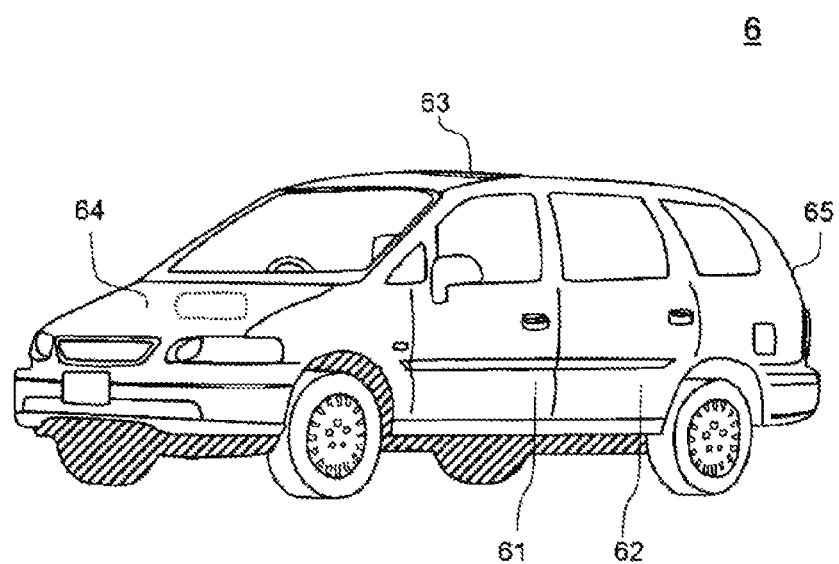
FIG. 11 is a view illustrating an exterior of a vehicle according to the present embodiment.

FIG. 11 is a view illustrating an exterior of a vehicle 6 in which the switch state detection circuit 10 is installed. The vehicle 6 includes front doors 61, rear doors 62, a sunroof 63, a bonnet 64, a trunk 65, and the like, which are parts corresponding to the opening and closing switches 5.

The front doors 61 are installed on left and right sides of a front seat, and mainly opened and closed when a person gets on and off the front seat. The rear doors 62 are installed on left and right sides of the back seat and mainly opened and closed when a person gets on and off the back seat.

The sunroof 63 is installed on a ceiling part of the vehicle 6, and opened and closed when sunlight is received into the vehicle 6 or blocked, for example.

The bonnet 64 is a part in which components such as an engine, and the like are housed, and installed in a front side of the vehicle 6. The bonnet 64 is opened and closed when components are checked, for example.

The trunk 65 is a part in which luggage, and the like are received, and installed in a rear side of the vehicle 6. The trunk 65 is opened and closed when luggage is put in or taken out, for example.

The switch state detection circuit 10 is connected to the foregoing respective parts 61 to 65 and any other parts that are opened and closed in the vehicle 6 to detect an opening and closing operation thereof. Upon receiving corresponding detection result information, the vehicle-mount control device controls the device within the vehicle 6 to turn on an alarm lamp or output an alarm sound, for example, when the foregoing respective parts 61 to 65 are open.

According to the circuit control device of the present disclosure, overheating of the circuit unit can be more appropriately restrained. Further, according to the circuit system, the switch state detection circuit, and the vehicle of the present disclosure, advantages of the circuit control device can be obtained.

In addition, it is possible to use the present disclosure in various devices, and the like having a plurality of circuit units.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A circuit control device for controlling power consumption of a plurality of circuit units at least including a first circuit unit and a second circuit unit disposed near the first circuit unit, wherein each of the plurality of circuit units is connected to the circuit control device, the circuit control device comprising:

a monitoring unit configured to monitor whether a detection temperature of each of the plurality of circuit units meets a predetermined overheat condition and whether a detection temperature of an overheated circuit unit meeting the overheat condition, among the plurality of circuit units, meets a predetermined overheat recovery condition; and an overheat protection unit configured to execute an overheat protection operation when the overheat condition is met in any one of the plurality of circuit units, and to stop the overheat protection operation when the overheat recovery condition is met, wherein the overheat protection unit is configured to execute the overheat protection operation to reduce power consumption of the first circuit unit when the overheat condition is met in the first circuit unit, and to reduce power consumption of the second circuit unit when the overheat recovery condition is not met after reducing the power consumption of the first circuit unit, and wherein the overheat protection unit is configured to execute the overheat protection operation to reduce the power consumption of the second circuit unit when the overheat condition is met in the second circuit unit, and to reduce the power consumption of the first circuit unit when the overheat recovery condition is not met after reducing the power consumption of the second circuit unit.

2. The circuit control device of claim 1, wherein the overheat condition is a condition met when a temperature is equal to or higher than a predetermined first threshold value, and the overheat recovery condition is a condition met when a temperature is equal to or lower than a predetermined second threshold value.

3. The circuit control device of claim 1, wherein the overheat protection unit is configured to execute the overheat protection operation to reduce power consumption of the first circuit unit when the overheat condition is met in the first circuit unit, and to reduce power consumption of the second circuit unit when the overheat recovery condition is not met within a predetermined period of time after reducing the power consumption of the first circuit unit, and wherein the overheat protection unit is configured to execute the overheat protection operation to reduce the power consumption of the second circuit unit when the overheat condition is met in the second circuit unit, and to reduce the power consumption of the first circuit unit when the overheat recovery condition is not met within a predetermined period of time after reducing the power consumption of the second circuit unit.

4. The circuit control device of claim 1, wherein the monitoring unit has a temperature sensor that corresponds to each of the plurality of circuit units.

5. A circuit system, comprising:
the circuit control device according to claim 1; and
a plurality of circuit units whose power consumption is controlled by the circuit control device.

6. The circuit system of claim 5, wherein the plurality of circuit units have the same circuit configuration.

7. The circuit system of claim 5, wherein each of the plurality of circuit units has a current source circuit configured to supply a current, and
the overheat protection operation is an operation to reduce an amount of the current in the overheated circuit unit.

8. A switch state detection circuit, comprising:
the circuit system according to claim 7; and
a detection unit configured to detect a state of each of a plurality of switches connected to the circuit system,
wherein each of the plurality of circuit units is configured to supply a current to a corresponding switch of the plurality of switches, and the detection unit is configured to detect the state of each of the plurality of switches based on the current supplied to each of the plurality of switches.

9. A vehicle, comprising:
the switch state detection circuit according to claim 8; and
a switch whose state is detected by the switch state detection circuit.

10. A circuit control device for controlling power consumption of a plurality of circuit units including at least a first circuit unit, a second circuit unit disposed near the first circuit unit, and a third circuit unit disposed near the second circuit unit, the second circuit unit located between the first circuit unit and the third circuit unit, wherein each of the plurality of circuit units is connected to the circuit control device, the circuit control device comprising:
a monitoring unit configured to monitor whether a detection temperature of each of the plurality of circuit units meets a predetermined overheat condition; and
an overheat protection unit configured to execute an overheat protection operation when the overheat condition is met in any one of the plurality of circuit units,
wherein the overheat protection unit is configured to execute the overheat protection operation to reduce power consumption of the first circuit unit and the second circuit unit, and to maintain power consumption of the third circuit unit when the overheat condition is met in the first circuit unit, and
wherein the overheat protection unit is configured to execute the overheat protection operation to reduce power consumption of the second circuit unit and the third circuit unit, and to maintain the power consumption of the first circuit unit when the overheat condition is met in the third circuit unit.

11. The circuit control device of claim 10, wherein the monitoring unit is configured to monitor whether a detection temperature of an overheated circuit unit meets a predetermined overheat recovery condition, and
when the overheat recovery condition is met, the overheat protection unit is configured to stop the overheat protection operation.

12. The circuit control device of claim 11, wherein the overheat condition is a condition met when a temperature is equal to or higher than a predetermined first threshold value, and
the overheat recovery condition is a condition met when a temperature is equal to or lower than a predetermined second threshold value.

13. The circuit control device of claim 11,
wherein the overheat protection unit is configured to execute the overheat protection operation to reduce the power consumption of the first circuit unit when the overheat condition is met in the first circuit unit, and reduce the power consumption of the second circuit unit when the overheat recovery condition is not met within a predetermined period of time after reducing the power consumption of the first circuit unit, and
wherein the overheat protection unit is configured to execute the overheat protection operation to reduce the power consumption of the third circuit unit when the overheat condition is met in the third circuit unit, and to reduce the power consumption of the second circuit unit when the overheat recovery condition is not met within a predetermined period of time after reducing the power consumption of the third circuit unit.

14. A circuit system, comprising:
the circuit control device according to claim 10; and
a plurality of circuit units whose power consumption is controlled by the circuit control device.

15. The circuit system of claim 14, wherein the plurality of circuit units have the same circuit configuration.

16. The circuit system of claim 14, wherein each of the plurality of circuit units has a current source circuit configured to supply a current, and
the overheat protection operation is an operation to reduce an amount of the current in the overheated circuit unit.

* * * * *